United States Patent

Fontanazzi et al.

[11] Patent Number: 6,085,495
[45] Date of Patent: Jul. 11, 2000

[54] PACKAGING UNIT FOR CONTINUOUSLY PRODUCING SEALED PACKAGES, CONTAINING POURABLE FOOD PRODUCTS, FROM A TUBE OF PACKAGING MATERIAL

[75] Inventors: Paolo Fontanazzi, Modena, Italy; Lennart Friberg, Vollsjo; Per Gustafsson, Bjarred, both of Sweden

[73] Assignee: Tetra Laval Holdings & Finance S.A., Pully, Switzerland

[21] Appl. No.: 09/094,692

[22] Filed: Jun. 15, 1998

[30] Foreign Application Priority Data

Jun. 27, 1997 [EP] European Pat. Off. .............. 97830313

[51] Int. Cl.[7] ...................................................... B65B 9/06
[52] U.S. Cl. .......................... 53/551; 53/374.5; 53/374.6; 53/375.4
[58] Field of Search ................................ 53/551, 552, 75, 53/374.5, 374.6, 375.4; 493/302

[56] References Cited

U.S. PATENT DOCUMENTS

| | | |
|---|---|---|
| 2,738,631 | 3/1956 | Järund . |
| 2,741,079 | 4/1956 | Rausing . |
| 2,784,540 | 3/1957 | Järund . |
| 3,001,348 | 9/1961 | Rado ........................................ 53/374.6 |
| 3,006,121 | 10/1961 | Omori . |
| 3,300,944 | 1/1967 | Thesing . |
| 3,320,718 | 5/1967 | Thesing . |
| 3,388,525 | 6/1968 | Thesing et al. . |
| 3,444,792 | 5/1969 | Thesing et al. . |
| 3,538,676 | 11/1970 | Runo ........................................ 53/374.6 |
| 3,555,652 | 1/1971 | Ignell . |
| 4,073,121 | 2/1978 | Greenawalt ............................... 53/552 |
| 4,074,961 | 2/1978 | Reil . |
| 4,387,547 | 6/1983 | Reil . |
| 4,614,078 | 9/1986 | Kawabe .................................... 53/551 |
| 4,637,199 | 1/1987 | Steck et al. .............................. 53/551 |
| 4,817,366 | 4/1989 | Konzal et al. . |
| 4,881,360 | 11/1989 | Konzal et al. . |
| 5,155,980 | 10/1992 | Mansson et al. . |

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product; the unit (1) has a first and second chain conveyor (10, 11) respectively having a number of jaws (12) and a number of counter-jaws (13), which interact with and grip the tube (14) to heat-seal the tube at successive cross sections by means of induction heating elements (29) on the jaws (12); and each counter-jaw (13) has a push bar (35) fitted to a main body (20) of the counter-jaw via the interposition of springs (75) defining the gripping pressure exerted on the packaging material.

9 Claims, 5 Drawing Sheets

PACKAGING UNIT FOR CONTINUOUSLY PRODUCING SEALED PACKAGES, CONTAINING POURABLE FOOD PRODUCTS, FROM A TUBE OF PACKAGING MATERIAL

This application claims priority under 35 U.S.C. §§119 and/or 365 to No. 97830313.9 filed in the EPO on Jun. 27, 1997; the entire content of which is hereby incorporated by reference.

The present invention relates to a packaging unit for continuously producing aseptic sealed packages, containing pourable food products, from a tube of packaging material.

More specifically, the packaging unit according to the present invention provides for producing substantially parallelepiped aseptic sealed packages.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

Packaging machines of the above type are known, in which the sections of the tube are sealed by two jaw units moved by respective arms so as to alternately grip the tube at successive sections for sealing. One jaw of each jaw unit comprises an induction heating element for locally melting the thermoplastic material when the jaw unit is gripped on to the tube, and so welding the thermoplastic covering to seal a cross section of the tube.

Each jaw unit performs a relatively complex operating cycle, in which the respective jaws are brought into contact with the tube at an upper station of the packaging machine; and the unit, firmly gripping the tube, is lowered, together with the tube, along the feed axis of the tube to seal the cross section, and is then opened at a lower station of the packaging machine. The same cycle, offset by a time interval corresponding to the output rate of the machine, is also performed by the second unit, so that each package is formed by a portion of the tube extending between a first seal made by one jaw unit, and a second seal made successively by the other jaw unit.

Though widely used and dependable, known machines of the type described above are limited in terms of output rate, on account of the cyclic reciprocating movement of the large masses involved (arms, jaws and respective actuators), the inertia of which limits the output rate to a few thousand cycles/hour, over and above which, dynamic problems are encountered such as to impair operation of the machine.

To increase the output rate of such machines, continuous packaging units have been proposed, which comprise two chain conveyors defining respective endless paths and respectively fitted with a number of jaws and counter-jaws. The two paths comprise respective branches substantially facing and parallel to each other, and between which the tube of packaging material is fed; and the jaws on one conveyor cooperate, along said branches of the respective paths, with corresponding counter-jaws on the other conveyor to grip the tube at a number of successive cross sections and so seal the packages. Continuous chain conveyor systems provide, to some extent, for eliminating the dynamic problems and so increasing the maximum output rates imposed by reciprocating systems.

Machines of this sort are illustrated, for example, in U.S. Pat. No. Re 33,467.

Though experimented for some time, to the Applicant's knowledge, such machines have failed, as yet, to find a satisfactory practical application.

One of the problems posed by machines of the above type is the difficulty in accurately and reliably controlling the contact pressure exerted on the packaging material by the jaws and counter-jaws to form the seal, and which is generated by contact between control cams fixed to the machine structure and respective cam-following members traveling along the respective cams and associated with respective jaws and counter-jaws. As the contact pressure depends to a large extent on fabrication and assembly tolerances, on the wear of the cams and respective cam-following members, and on operating temperature, considerable difficulty is encountered in setting up the machine and maintaining optimum operating conditions.

Controlling the sealing pressure is essential for achieving a reliable production process ensuring no damage to the package, and so preserving the aseptic characteristics of the contents.

It is an object of the present invention to provide a packaging unit for continuously producing aseptic sealed packages containing pourable food products, and which provides for eliminating the aforementioned drawbacks typically associated with known machines.

According to the present invention, there is provided a packaging unit for continuously producing aseptic sealed packages, containing a pourable food product, from a tube made of heat-seal packaging material in sheet form, fed along a vertical supply path, and filled with said food product; said unit comprising:

a first chain conveyor having a number of jaws, and defining an endless first path along which said jaws are fed;

a second chain conveyor having a number of counter-jaws, and defining an endless second path along which said counter-jaws are fed;

said first and said second path comprising respective work portions adjacent to said supply path of the tube of packaging material, and extending substantially symmetrically on opposite sides of said supply path, so that said jaws cooperate with respective said counter-jaws to grip said tube at respective equally spaced cross sections;

said unit also comprising, along at least said respective work portions, first cam guide means for guiding said jaws, and second cam guide means for guiding said counter-jaws; said jaws and said counter-jaws comprising cam-following means cooperating with said respective first and second cam guide means;

and said jaws and said counter-jaws also comprising, respectively, heating means for heat-sealing said packaging material, and push means for exerting gripping pressure to grip said packaging material against said heating means;

characterized in that said counter-jaws each comprise a main body in turn comprising said cam-following means and defining a link of said second chain conveyor; said push means comprising a pressure element fitted to and movable with respect to said main body in the direction of said gripping pressure, and elastic means interposed between said main body and said pressure element and defining said gripping pressure.

A preferred, non-limiting embodiment of the present invention will be described by way of example with reference to the accompanying drawings, in which.

Figure 1:
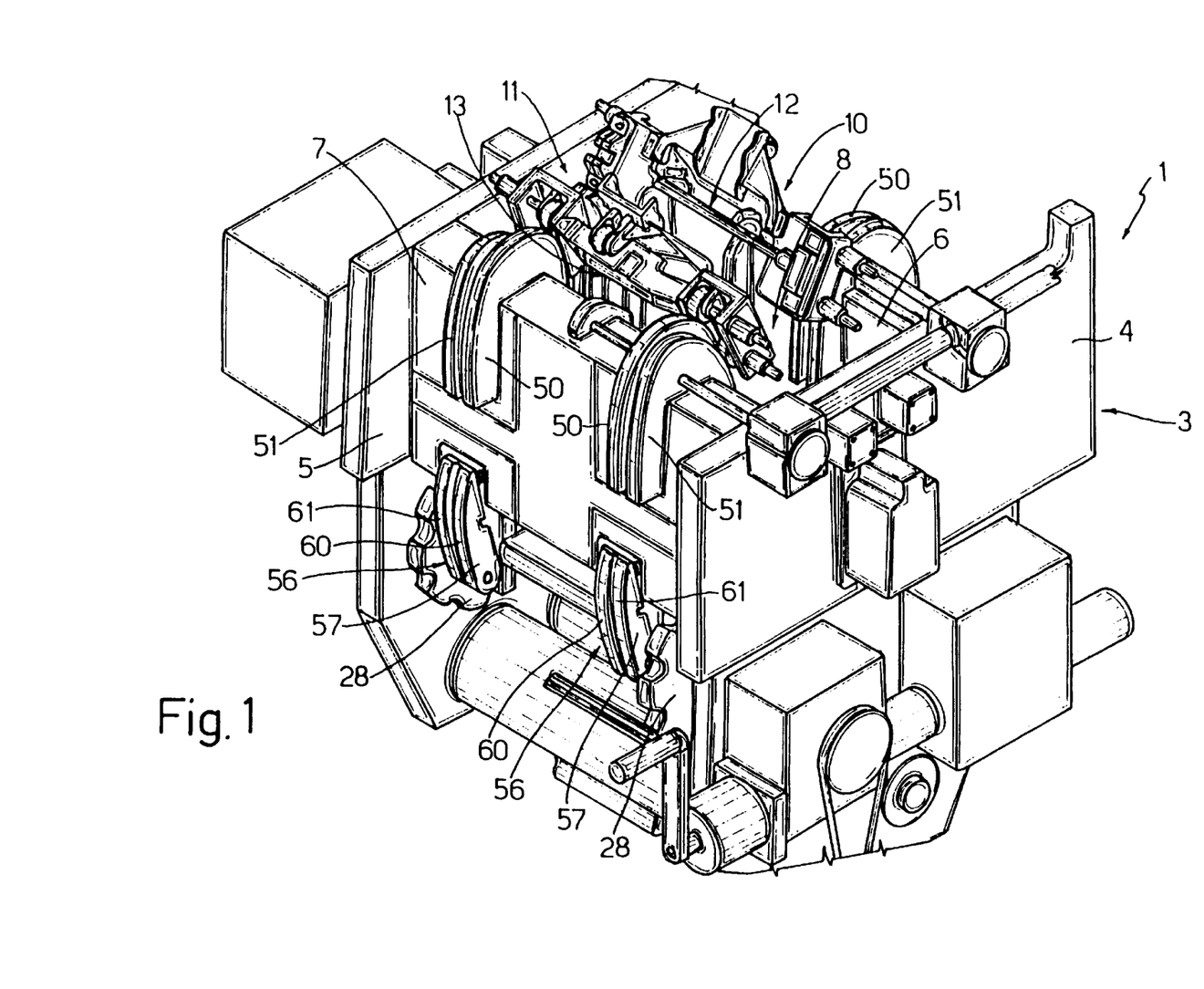
FIG. 1 shows a view in perspective, with parts removed for clarity, of a packaging unit in accordance with the teachings of the present invention.
Figure 2:
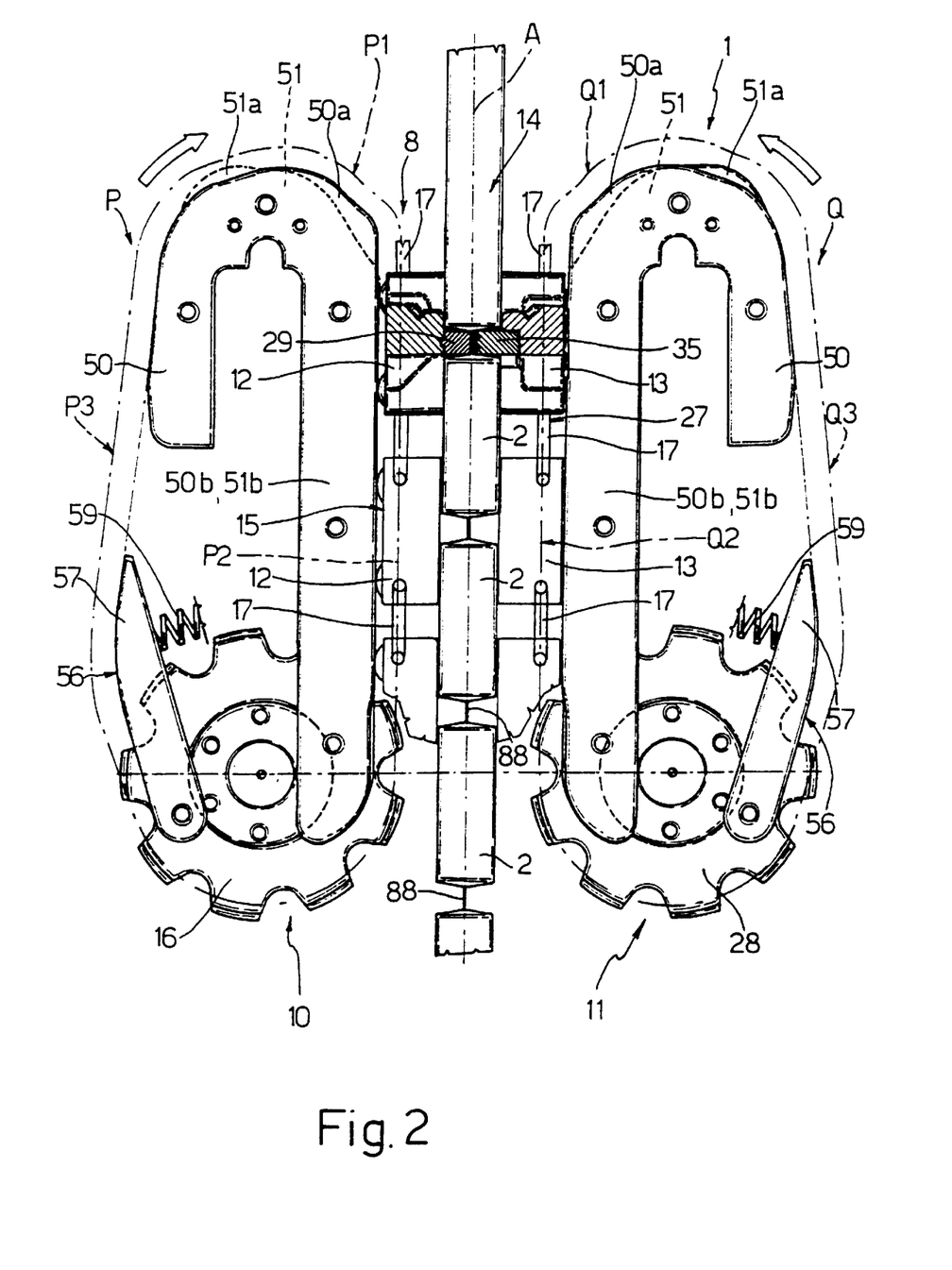
FIG. 2 shows a partial schematic side view of the FIG. 1 unit.

With reference to FIGS. 1 and 2, number 1 indicates a packaging unit for continuously producing, from a tube 14 of packaging material, aseptic sealed packages 2 containing a pourable food product, such as pasteurized or UHT milk, fruit juice, wine, etc.

Tube 14 is formed in known manner upstream from unit 1 by longitudinally folding and sealing a strip of heat-seal material, and is filled upstream with the sterilized or sterile-processed food product for packaging.

Unit 1 comprises a frame 3 (FIG. 1) defined by two side walls 4, 5 and by two parallel transverse walls 6, 7 fitted rigidly between side walls 4, 5 and defining, with side walls 4, 5, an opening 8; and two chain conveyors 10, 11 fitted to frame 3 and respectively comprising jaws 12 (only one shown in FIG. 1) and counter-jaws 13 (only one shown in FIG. 1) cooperating with each other to interact with the tube 14 of packaging material fed along a vertical path A through opening 8.

Conveyors 10 and 11 define respective endless paths P and Q along which jaws 12 and counter-jaws 13 are fed, and which respectively extend about walls 6 and 7 of frame 3.

Conveyor 10 comprises an articulated chain 15 extending along path P; and two drive wheels 16 meshing with and on both sides of chain 15 at the bottom end of path P. Jaws 12 are an integral part of and define alternate links of chain 15, and are connected to one another in articulated manner by pairs of links 17.

More specifically, each jaw 12 (FIG. 3) comprises an elongated main body 20 extending in a direction perpendicular to path A and parallel to wall 6, and having respective end projections 21 and 22, each of which has a projecting first and second pin 23, 24 spaced with respect to each other and having respective axes 25, 26 parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q. Chain 27 is defined by a number of counter-jaws 13 connected in articulated manner to one another and only described in detail insofar as they differ from jaws 12, and using the same numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

Figure 4:
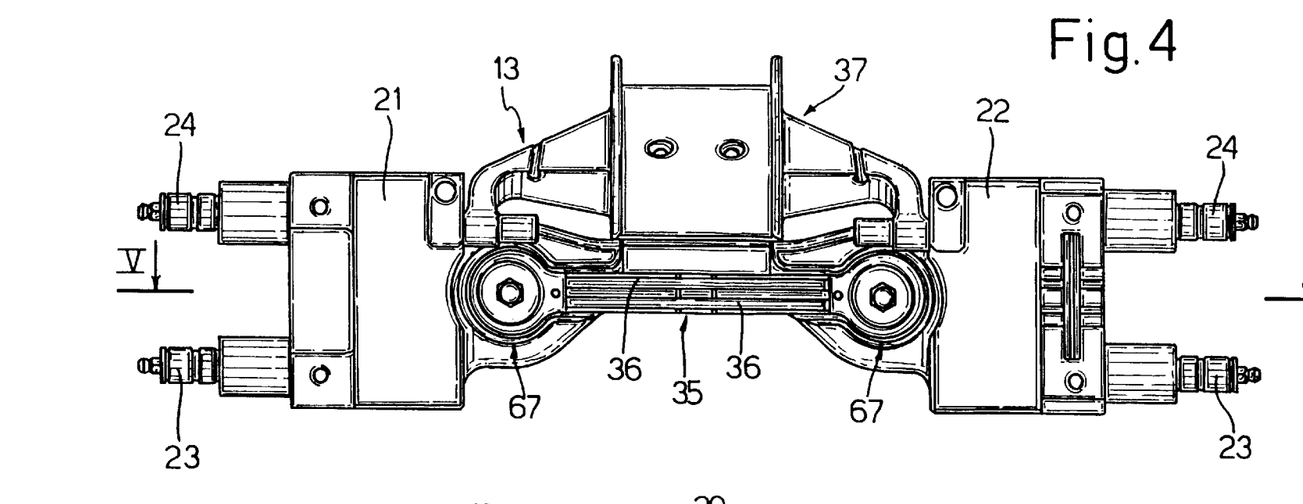
FIG. 4 shows a front view of the FIG. 3 counter-jaw.

As opposed to a heating element 29, each counter-jaw 13 (FIGS. 4 and 5) comprises a pressure bar 35, which cooperates with heating element 29 of corresponding jaw 12 to grip a cross section of tube 14 (FIG. 2). On a front surface 46 facing corresponding jaw 12 in use, bar 35 comprises two bands 36 of relatively flexible elastomeric material, which cooperate with the packaging material in opposition to the active surfaces 30 of heating element 29.

Jaws 12 and counter-jaws 13 each comprise a respective control device 37—not forming part of the present invention, and therefore not described in detail—for controlling the volume of package 2 as it is being formed.

The movement of jaws 12 and counter-jaws 13 is controlled by respective pairs of cams 50, 51 fitted to walls 6, 7 of frame 3 and cooperating with respective pairs of rollers 52, 53 on jaws 12 and counter-jaws 13.

Figure 3:
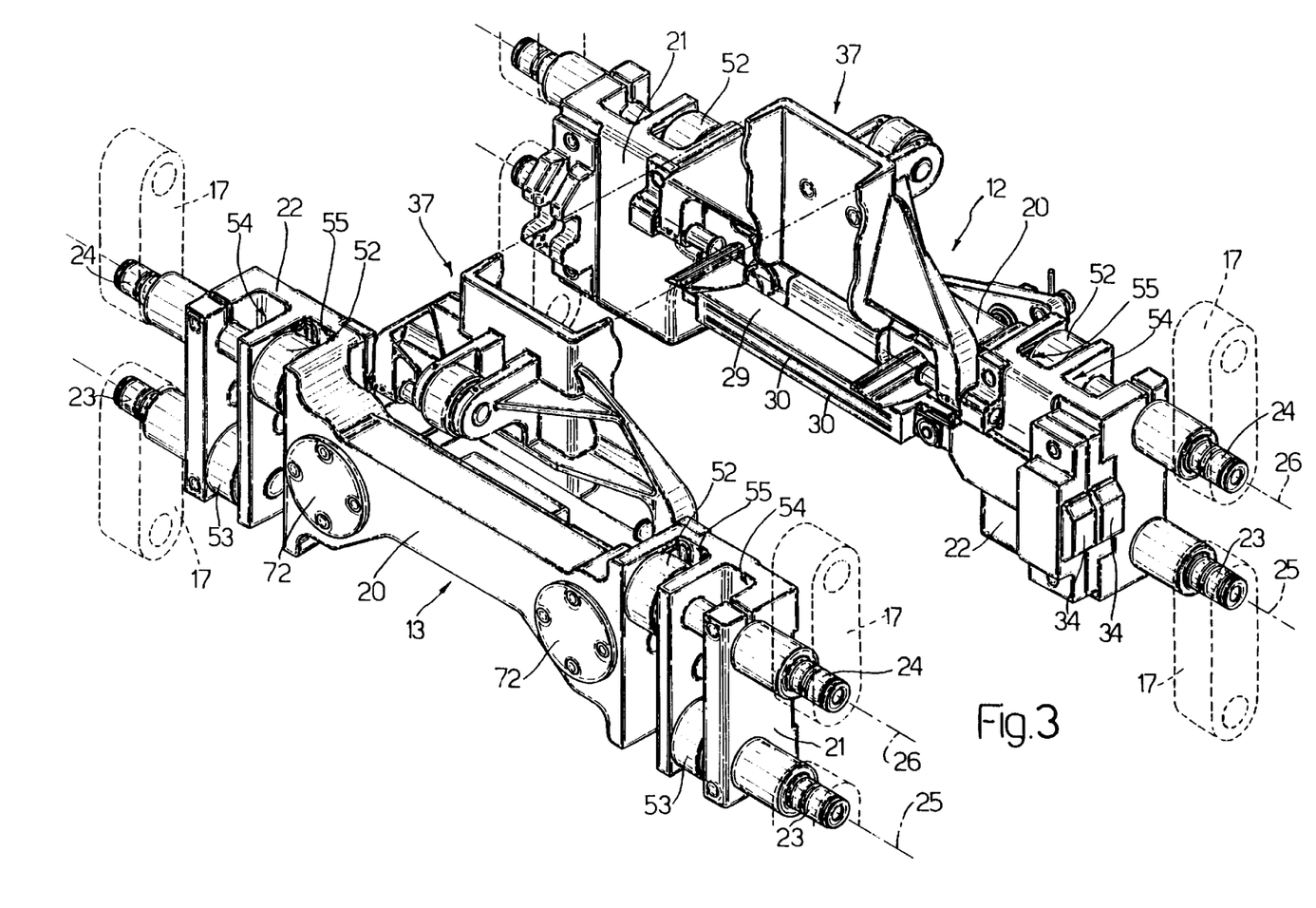
FIG. 3 shows a view in perspective of a jaw and corresponding counter-jaw of the FIG. 1 unit.

More specifically, and as shown in FIG. 3, jaws 12 and counter-jaws 13 each comprise a first pair of rollers 52, 53 fitted idly inside end projection 21 of main body 20, and a second pair of rollers 52, 53 fitted idly inside end projection 22 of main body 20; and projections 21, 22 each comprise a pair of parallel, side by side seats 54, 55 formed on the rear side (i.e. the side facing away from heating element 29 or pressure bar 35) and extending in a direction perpendicular to axes 25, 26 of pins 23, 24 and substantially parallel to the plane defined by axes 25, 26.

The roller 53 in each pair is housed inside a respective outer seat 54 (i.e. closer to the end of body 20) and fitted to a respective pin 23; and the roller 52 in each pair is housed inside a respective inner seat 55 and fitted to a respective pin 24.

Wall 6 (FIG. 1) is fitted with two pairs of cams 50, 51 which cooperate with respective pairs of rollers 52, 53 of jaws 12; and, similarly, wall 7 is fitted with two pairs of cams 50, 51 which cooperate with respective pairs of rollers 52, 53 of counter-jaws 13.

Cams 50, 51 comprise respective substantially U-shaped portions 50a, 51a extending about the top edge of respective walls 6, 7 to define, for respective chains 15, 27 of conveyors 10, 11, a transmission opposite respective drive wheels 16 and 28; and respective portions 50b, 51b extending along respective walls 6, 7, inside opening 8. Portions 50a, 51a define path portions P1, Q1 along which jaws 12 and counter-jaws 13 approach and contact tube 14 of packaging material; and portions 50b, 51b define facing, substantially parallel path portions P2, Q2 along which jaws 12 and counter-jaws 13 are maintained contacting under pressure to form the seals defining packages 2.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning the chains as to ensure rollers 52, 53 of jaws 12 and counter-jaws 13 are maintained contacting relative cams 50, 51.

Each tensioner 56 comprises a movable shoe 57 hinged about a horizontal axis to a support fixed to wall 6 or 7; and a spring 59 interposed between shoe 57 and wall 6 or 7. On the face facing away from wall 6 or 7, shoe 57 comprises two side by side rolling tracks 60, 61, which, by virtue of spring 59, cooperate respectively with rollers 52 and 53 of jaws 12 or counter-jaws 13.

Figure 5:
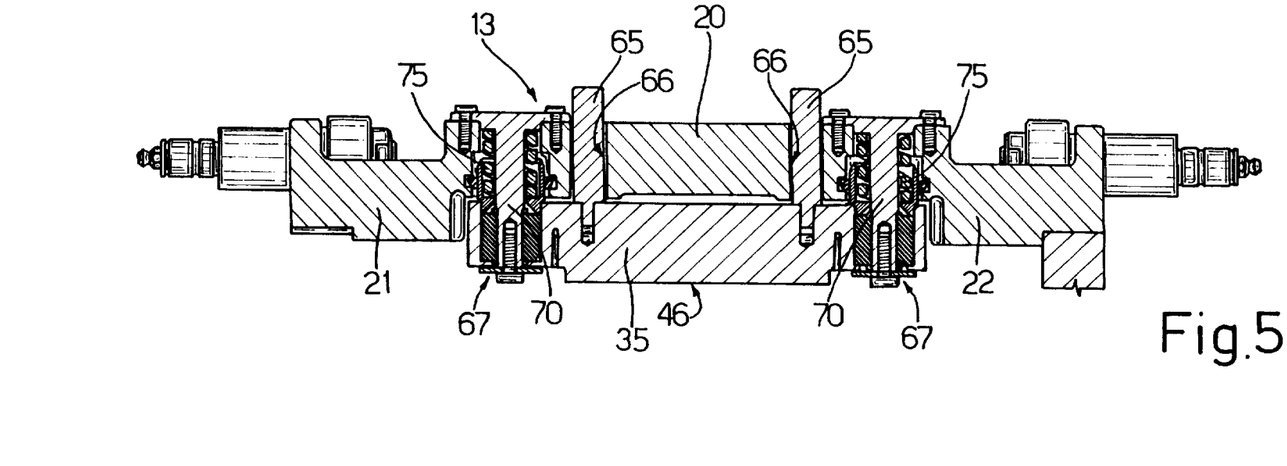
FIG. 5 shows a section along line V—V in FIG. 4.
Figure 7:
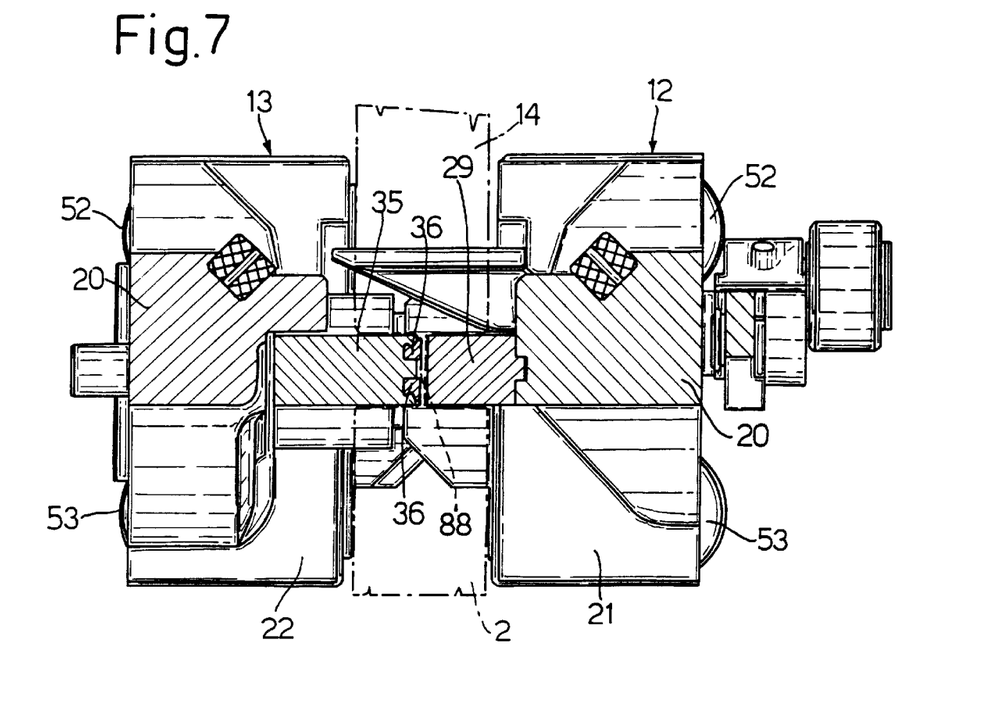
FIG. 7 shows a half cross section, with parts removed for clarity, of the FIG. 3 jaw and counter-jaw in the gripping position.

According to the present invention, pressure bar 35 of each counter-jaw is so fitted to main body 20 as to be allowed a limited amount of movement in a direction perpendicular to the plane defined by axes 25, 26 of pins 23, 24; which direction, indicated X in FIGS. 5 and 7, defines, in use, the direction in which pressure is applied by each jaw/counter-jaw pair on tube 14.

Two pins 65 with respective axes parallel to direction X are fitted, in particular screwed, in projecting manner to the rear of bar 35, at opposite ends of front surface 46 of the bar, and loosely engage respective locating holes 66 formed in main body 20.

Bar 35 is fitted to main body 20 via the interposition of two elastic connecting assemblies 67 for generating, in use, a reaction pressure in direction X to keep bar 35 against respective jaw 12.

Figure 6:
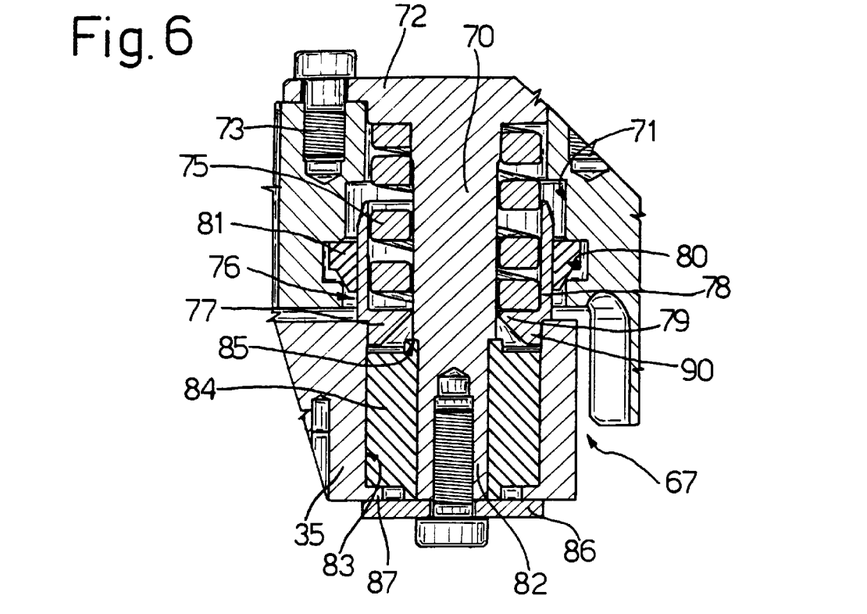
FIG. 6 shows a larger-scale detail of FIG. 5.

Assemblies 67 are located at opposite ends of bar 35, alongside front surface 46, and a larger-scale section of one of assemblies 67 is shown in FIG. 6, to which reference is made below.

Each assembly 67 substantially comprises a guide shaft 70 having an axis parallel to direction X, and which is fitted with ample radial slack through a substantially cylindrical through cavity 71 in main body 20, and comprises an end flange 72 fitted to the rear of body 20 by a number of screws 73 about cavity 71.

Cavity 71 houses a highly rigid coil spring 75 made of quadrangular-section wire and compressed between flange 72 and a cup-shaped element 76 slidable axially and loosely inside cavity 71 and connected axially and radially to bar 35. More specifically, element 76 comprises an annular base wall 77 cooperating axially with spring 75, and a cylindrical wall 78 housed loosely inside cavity 71; and wall 77 comprises a tapered inner knife edge 79 cooperating in sliding manner with shaft 70.

Cavity 71 comprises a circumferential groove 80 housing an annular seal 81, which cooperates in sliding manner with cylindrical wall 78 of element 76; and cavity 71 and element 76 are conveniently filled with lubricating grease.

A smaller-diameter end portion 82 of shaft 70 is housed inside a cylindrical seat 83 of pressure bar 35 via the interposition of a bush 84 of elastomeric material.

Bush 84 is packed between a shoulder 85 of shaft 70 and a stop washer 86 coaxial with shaft 70 and fitted to the end of end portion 82 of the shaft. The peripheral edge of washer 86 cooperates axially with an annular shoulder 87 of seat 83 of bar 35 to grip shoulder 87 axially against bush 84 and hold bar 35 against element 76 in opposition to spring 75. More specifically, base wall 77 of element 76 defines a locating collar 90 engaging seat 83 of pressure bar 35.

Unit 1 operates as follows.

Conveyors 10, 11 are rotated in known manner in opposite directions, as indicated by the arrows in FIG. 2, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

After a first stage wherein tube 14 is contacted and gradually compressed, and the packaging material is folded locally to form a flat sealing strip 88 extending crosswise to tube 14, jaws 12 and counter-jaws 13 reach respective straight portions 50b, 51b of cams 50, 51 (FIG. 2) where maximum gripping pressure is applied to tube 14 and heating element 29 of each jaw 12 is supplied to form the heat seal.

The distance between portions 50b and between portions 51b of respective substantially homologous cams 50, 51 of jaws 12 and counter-jaws 13 is constant along the greater part of said portions, and is so selected as to slightly compress and deform springs 75 of counter-jaws 13.

Such compression is made possible by the axial elastic rigidity of bushes 84 of elastomeric material being considerably less than that of springs 75, so that, when bar 35 cooperates with heating element 29 of the corresponding jaw 12 to grip the packaging material, the pressure to which bar 35 is subjected in gripping direction X axially compresses bushes 84, and is almost entirely transmitted to springs 75 via respective cup-shaped elements 76.

As springs 75 are only deformed to a very small extent, the gripping pressure exerted on the packaging material is substantially determined by the preload of springs 75.

The advantages of unit 1 according to the present invention will be clear from the foregoing description.

In particular, assemblies 67 elastically connecting pressure bars 35 to respective counter-jaws 13 provide, in a straightforward manner, for accurately and reliably controlling the gripping pressure exerted on the packaging material.

Moreover, by virtue of inner knife edges 79 and relatively flexible elastic bushes 84 permitting cup-shaped elements 76 to rock on shafts 70, assemblies 67 allow bar 35 to adapt its position to a certain, albeit limited, extent, so that, even in the event of minor positioning errors of bar 35, due to machining and assembly tolerances, bar 35 exerts uniform pressure along the whole of the sealing portion.

Finally, elastic bushes 84 provide for eliminating sliding connections between each bar 35 and respective shafts 70, thus preventing, in combination with seal 81, infiltration inside cavity 71 of external agents, particularly liquids, which might oxidize the spring and result in the formation of scale, thus impairing efficient operation of elastic connecting assemblies 67.

Clearly, changes may be made to unit 1 as described and illustrated herein without, however, departing from the scope of the claims.

We claim:

1. A packaging unit useful for continuously producing aseptic sealed packages, containing a pourable food product, from a tube made of heat-seal packaging material in sheet form, fed along a vertical supply path, and filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said supply path of the tube of packaging material, and extending substantially symmetrically on opposite sides of said supply path, so that said jaws cooperate with respective counter-jaws to grip said tube at respective equally spaced cross sections when said tube is advanced along said supply path;

first cam guide means along at least said respective work portions for guiding said jaws;

second cam guide means for guiding said counter-jaws;

said jaws and said counter-jaws comprising cam-following means cooperating with said respective first and second cam guide means;

said jaws and said counter-jaws comprising, respectively, heating means for heat-sealing said packaging material, and push means for exerting gripping pressure along a gripping pressure direction to grip said packaging material against said heating means;

said counter-jaws each comprise a main body, each main body comprising said cam-following means, said push means comprising at least two pressure applying assemblies within said main body and defining a link of said second chain conveyor;

said push means comprising a pressure element connecting and pressure applying assemblies and movable with respect to said main body in the gripping pressure direction, and elastic means interposed between said main body and said pressure element and defining said gripping pressure.

2. A unit according to claim 1, wherein said pressure element comprises an elongated bar extending in a direction perpendicular to said supply path of said tube of packaging material, said two pressure applying assemblies comprising a pair of elastic connecting assemblies including said elastic means and connecting said pressure element to said main body close to respective opposite ends of the pressure element.

3. A unit according to claim 2, wherein said elastic connecting assemblies each comprise a substantially closed seat housing said elastic means and sealing means for preventing the infiltration of external agents inside said seat.

4. A unit according to claim 2, wherein said elastic connecting assemblies each comprise a guide element for guiding said pressure element, each of said guide elements fitted to said main body and extending in said gripping pressure direction; and locating means for positioning said pressure element with respect to said guide element and permitting a small amount of misalignment.

5. A packaging unit useful for continuously producing aseptic sealed packages, containing a pourable food product, from a tube made of heat-seal packaging material in sheet form, fed along a vertical supply path, and filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said supply path of the tube of packaging material, and extending substantially symmetrically on opposite sides of said supply path, so that said jaws cooperate with respective counter-jaws to grip said tube at respective equally spaced cross sections when said tube is advanced along said supply path;

first cam guide means along at least said respective work portions for guiding said jaws;

second cam guide means for guiding said counter-jaws;

said jaws and said counter-jaws comprising cam-following means cooperating with said respective first and second cam guide means;

said jaws and said counter-jaws each comprising, respectively, heating means for heat-sealing said packaging material, and push means for exerting gripping pressure along a gripping pressure direction to grip said packaging material against said heating means;

said counter-jaws each comprise a main body, each main body comprising said cam-following means and defining a link of said second chain conveyor;

said push means each comprising a pressure element fitted to and movable with respect to said main body in the gripping pressure direction, and elastic means interposed between said main body and said pressure element and defining said gripping pressure;

wherein said pressure element comprises an elongated bar extending in a direction perpendicular to said supply path of said tube of packaging material, said push means comprising a pair of elastic connecting assemblies including said elastic means and connecting said pressure element to said main body close to respective opposite ends of the pressure element;

wherein said elastic connecting assemblies each comprise a guide element for guiding said pressure element, each of said guide elements fitted to said main body and extending in said gripping pressure direction; and locating means for positioning said pressure element with respect to said guide element and permitting a small amount of misalignment;

wherein said locating means comprises a flexible element connected to said pressure element to said guide element in said gripping pressure direction and which is deformable to allow said pressure element to move with respect to said guide element with no mutually sliding contacting surfaces.

6. A packaging unit useful for continuously producing aseptic sealed packages, containing a pourable food product, from a tube made of heat-seal packaging material in sheet form, fed along a vertical supply path, and filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said supply path of the tube of packaging material, and extending substantially symmetrically on opposite sides of said supply path, so that said jaws cooperate with respective counter-jaws to grip said tube at respective equally spaced cross sections when said tube is advanced along said supply path;

first cam guide means along at least said respective work portions for guiding said jaws;

second cam guide means for guiding said counter-jaws;

said jaws and said counter-jaws comprising cam-following means cooperating with said respective first and second cam guide means;

said jaws and said counter-jaws each comprising, respectively, heating means for heat-sealing said packaging material, and push means for exerting gripping pressure along a gripping pressure direction to grip said packaging material against said heating means;

said counter-jaws each comprise a main body, each main body comprising said cam-following means and defining a link of said second chain conveyor;

said push means each comprising a pressure element fitted to and movable with respect to said main body in the gripping pressure direction, and elastic means interposed between said main body and said pressure element and defining said gripping pressure;

wherein said pressure element comprises an elongated bar extending in a direction perpendicular to said supply path of said tube of packaging material, said push means comprising a pair of elastic connecting assemblies including said elastic means and connecting said pressure element to said main body close to respective opposite ends of the pressure element;

wherein said elastic connecting assemblies each comprise a guide element for guiding said pressure element, each of said guide elements fitted to said main body and extending in said gripping pressure direction; and locating means for positioning said pressure element with respect to said guide element and permitting a small amount of misalignment;

wherein said guide element is a shaft having an axis parallel to said gripping pressure direction, said shaft extending through said seat housing said elastic means and fixed rigidly to said main body;

said elastic means comprising a spring coaxial with said shaft; and said locating means comprising a cup-shaped element connected to said pressure element and having a base wall cooperating axially with said spring and a lateral wall sliding inside said seat housing said spring.

7. A unit according to claim 6, wherein said base wall of said cup-shaped element comprises an inner tapered knife edge sliding on said shaft.

8. A unit according to claim 6, wherein said sealing means comprises an annular seal housed in said seat and slidingly cooperating with said lateral wall of said cup-shaped element.

9. A packaging unit useful for continuously producing aseptic sealed packages, containing a pourable food product, from a tube made of heat-seal packaging material in sheet form, fed along a vertical supply path, and filled with said food product, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said supply path of the tube of packaging material, and extending substantially symmetrically on opposite sides of said supply path, so that said jaws cooperate with respective counter-jaws to grip said tube at respective equally spaced cross sections when said tube is advanced along said supply path;

first cam guide means along at least said respective work portions for guiding said jaws;

second cam guide means for guiding said counter-jaws;

said jaws and said counter-jaws comprising cam-following means cooperating with said respective first and second cam guide means;

said jaws and said counter-jaws each comprising, respectively, heating means for heat-sealing said packaging material, and push means for exerting gripping pressure along a gripping pressure direction to grip said packaging material against said heating means;

said counter-jaws each comprise a main body, each main body comprising two connecting holes, two cylindrical cavities, said cam-following means, and defining a link of said second chain conveyor;

said push means comprising a pressure element fitted to and movable with respect to said main body in the gripping pressure direction, and elastic means interposed between said main body and said pressure element and defining said gripping pressure;

said pressure element comprising two spaced apart pressure applying assemblies; and guide means positioned between said pressure applying assemblies for guiding said pressure element in said gripping pressure direction, said guide means comprising
at least two pins connected to the pressure element and extending into said connecting holes; and
at least two guide shafts positioned between said at least two pins, each guide shaft engaging one of said two cylindrical cavities.

* * * * *